United States Patent [19]

Alarcon Opazo

[11] 4,356,639
[45] Nov. 2, 1982

[54] COMPACT PORTABLE DIGITAL MULTIMETER FOR INSTANTANEOUS MEASURING OF HEIGHT DIFFERENCES INDEPENDENTLY OF VISIBILITY

[76] Inventor: Jorge Alarcon Opazo, Freire No. 551, Rancagua, Chile

[21] Appl. No.: 195,936

[22] Filed: Oct. 10, 1980

[30] Foreign Application Priority Data

Aug. 8, 1980 [CL] Chile .................................. 572-80

[51] Int. Cl.$^3$ .............................................. G01C 5/04
[52] U.S. Cl. ................................ 33/367; 73/432 HA
[58] Field of Search ........... 73/432 HA; 33/1 H, 366, 33/367

[56] References Cited

U.S. PATENT DOCUMENTS

| | | | |
|---|---|---|---|
| 2,557,021 | 6/1951 | Williams | 73/432 HA |
| 3,048,927 | 8/1962 | Maloof | 33/366 |
| 3,815,423 | 6/1974 | Gearhart | 73/432 HA |
| 4,145,817 | 3/1979 | Ager | 33/367 |

FOREIGN PATENT DOCUMENTS

| | | | |
|---|---|---|---|
| 52-25664 | 2/1977 | Japan | 33/367 |
| 52-56561 | 5/1977 | Japan | 33/367 |

OTHER PUBLICATIONS

Crumrine, K. C., et al., Hydrostatic Level for Elevation Surveying, Geophysics, vol. XVI, No. 3, Jul. 1951, pp. 486–493.

Primary Examiner—Anthony V. Ciarlante
Assistant Examiner—Joseph W. Roskos
Attorney, Agent, or Firm—Robert E. Burns; Emmanuel J. Lobato; Bruce L. Adams

[57] ABSTRACT

A device for measuring height despite difficult visibility comprises a small portable water tank positioned at the location to be measured and a pressure transducer placed at a reference location and connected with the water tank by a hose, whereby the transducer outputs a signal voltage proportional to hydrostatic pressure and hence to the height of the first location. The output signal is amplified and converted to a digital value which is displayed by a digital display calibrated in terms of height.

4 Claims, 3 Drawing Figures

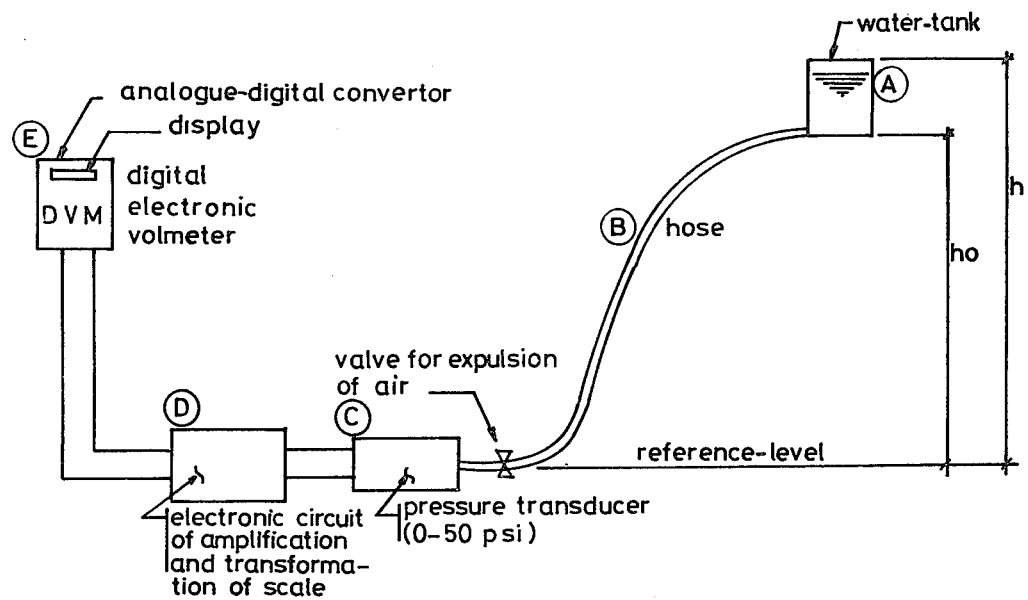
FIG. Nº 1
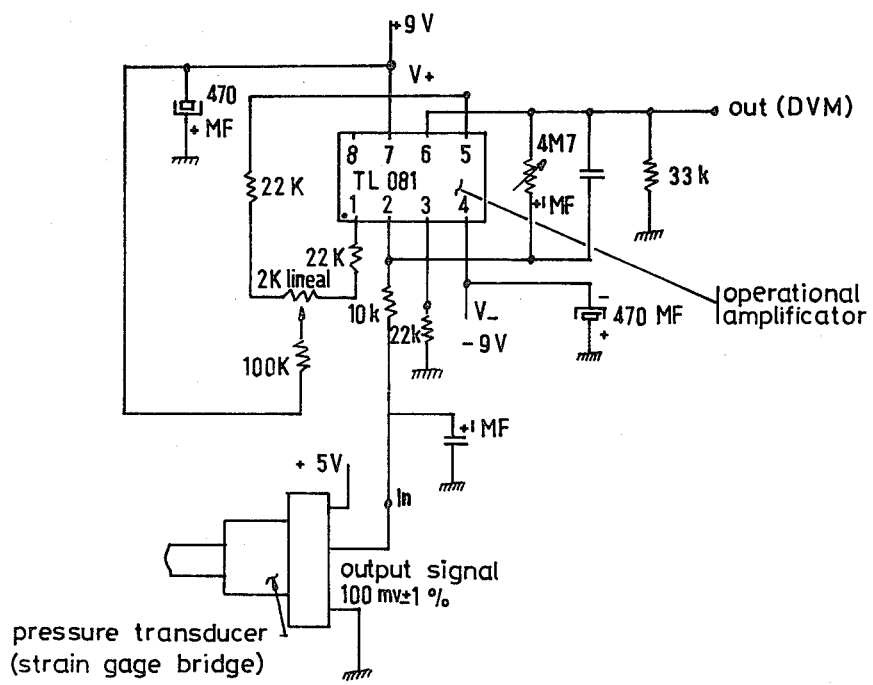
FIG. Nº 2

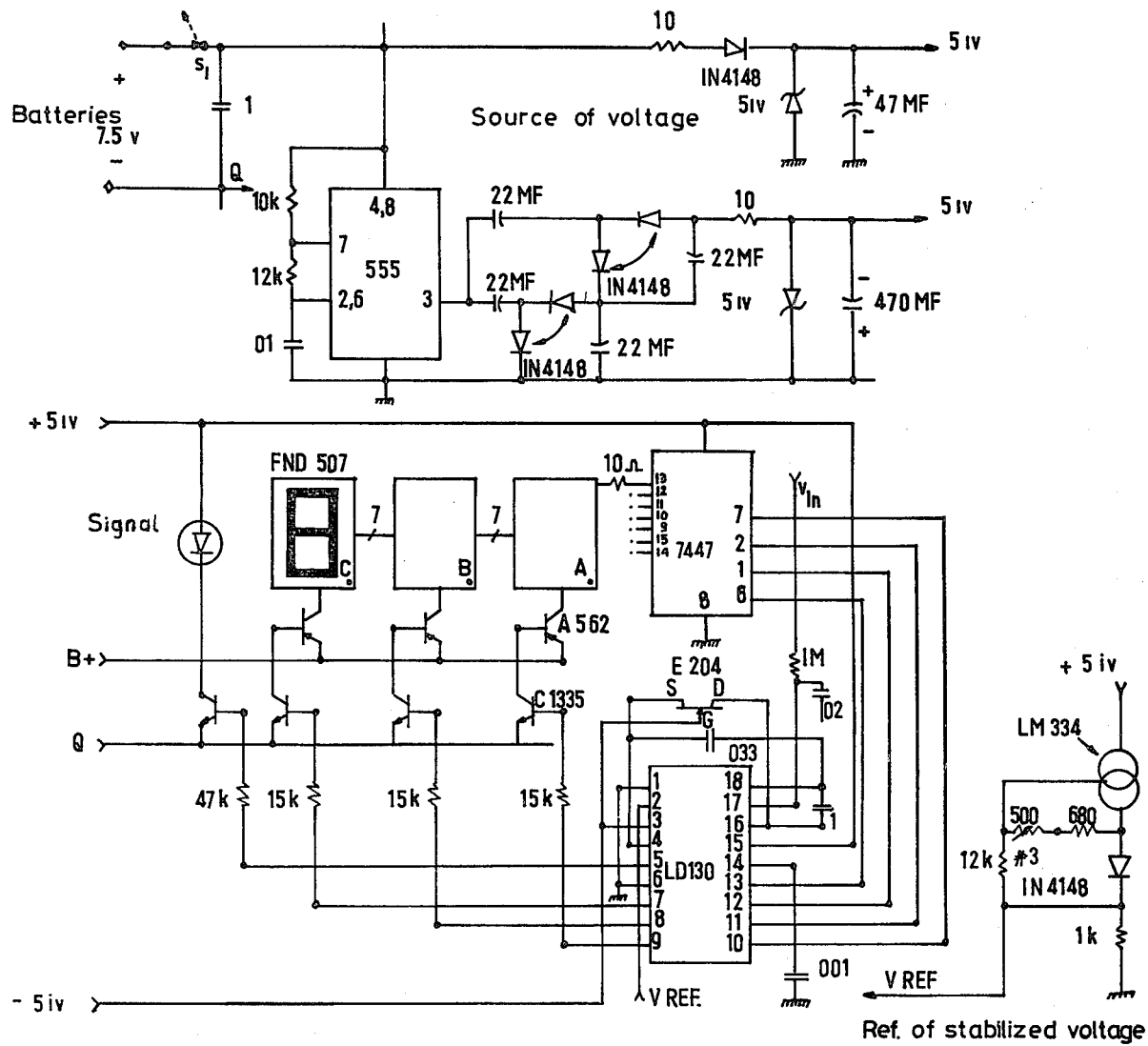
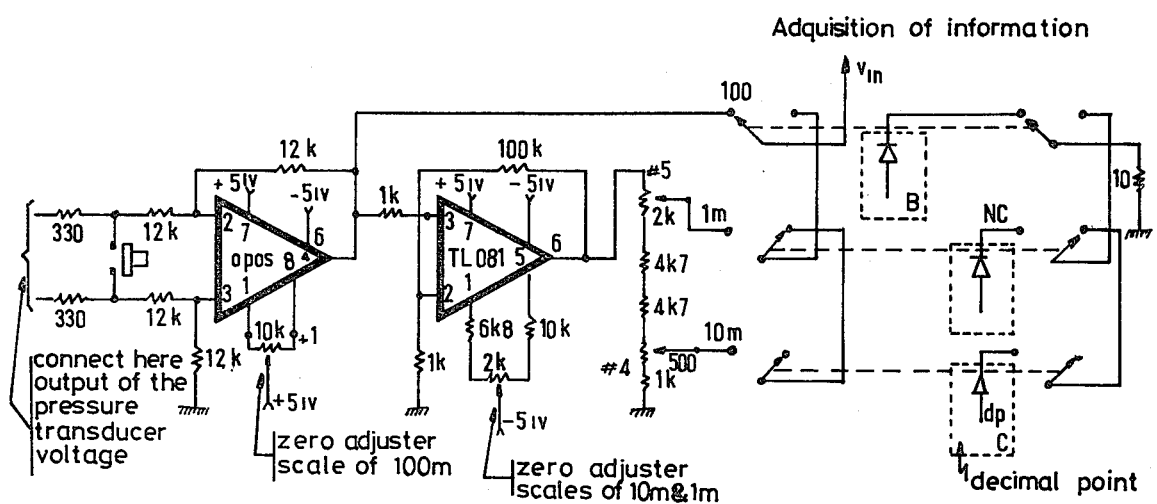
FIG. 3

COMPACT PORTABLE DIGITAL MULTIMETER FOR INSTANTANEOUS MEASURING OF HEIGHT DIFFERENCES INDEPENDENTLY OF VISIBILITY

FIELD OF THE INVENTION

The present invention relates to a new and improved electronic circuit of amplification and transformation of scale combined with a pressure transducer and a hydrostatic pressure device for measuring height differences even if no visibility exists.

BACKGROUND

Presently for the realization of measuring height differences with the topographycally necessary accuracy and in the disposable time, clear visibility is required. This has the following disadvantages:

(a) Before beginning the with leveling the felling of trees of often necessary.

(b) Aditional measurements are required around the obstacles of visibility as buildings, mountains and so on.

(c) Also it may be necessary to use spot lights or reflectors during the topographic work at night, in fog or in tunnels, mines and other places without visibility.

(d) The meterorological conditions of weather also often constrain the execution of topographical height measurements, as fog, rain and the atmospheric refraction of hot air.

(e) The same disadvantage appears in spots of great thermical refraction as foundries and furnaces.

(f) The above indicated disadvantages, aside from being very anoying, cause an increase in the operating costs and operating time.

SUMMARY OF THE INVENTION

An object of the present invention is to provide a method and devices for the measuring of height differences, in any class of ground and time, free from the above described disadvantages.

The method of the present invention is new, though it uses known devices in a new combination, transmitting hydrostatic pressure to compact portable digital multimeter utilizing a new electronic circuit. This method allows to measure the hydrostatic pressure difference between a little portable water reservoir and a pressure transducer by means of said new digital multimeter the little portable reservoir, or tank being coupled to the pressure transducer by a hose.

The little portable filled water tank is placed with its bottom on the spot, the height of which is to be determined.

The hydrostatic pressure of the water is transmitted by the hose to the pressure transducer. The difference of the level between the bottom of the little portable water tank and the pressure sensitive surface of the transducer is obtained by means of the new electronic circuit of the digital multimeter of the present invention instantaneously in the numerical display of the analogue digital converter (electronic voltmeter), independently of the luminosity, the temperature or the existing obstructions of visibility.

Leveling by the method of the present invention requires only one topographer and one assistant for the transport of the portable tank and the hose. The digital multimeter may be operated by a foreman.

BRIEF DESCRIPTION OF THE DRAWINGS

FIG. 1 Is a schematic diagram of the leveling electronic hydrostatic device NIMA 3.

FIG. 2 Is a detailed view of the circuit of amplication and transformation of scale.

FIG. 3 Alternative circuit of amplification and transformation scale.

DETAILED DESCRIPTION OF THE DEVICE

The electronic-hydrostatic leveling device of the present invention, named NIMA 3, is a system composed by a tank of water, made of synthetic fiber, aluminium or stainless steel (element A of FIG. 1) connected to a hose of plastics material (element B of FIG. 1), attached at his other extremity to a pressure transducer of bridge type with strain gauges, balanced for a zero relative pressure (element C of FIG. 1), with a range of 0 to 50 PSI.

The variations of pressure of the water column generated by the water in the portable tank, which can be displaced vertically and horizontally, produce the deformation of an elastic diaphragm of the pressure transducer and consequently also deformation in the strain gauges, causing a lost of balance of the bridge, generating a signal of voltage. The signal generated by the differences of the hydrostatic pressure are transformed and amplified by an electronic circuit specially designed for this purpose and constituted basically by an operational amplifier, power batteries, resistances, condensers and trimmers (element D of FIG. 1.) and shown schematically in the circuit of FIG. 2.

The signal of the output voltage (V out) is measured with digital voltmeter (element E of FIG. 1). Adjusting the trimmers corresponding to the adjustment of 0 and of the feed-back resistance it is possible to obtain the direct read out, it is a voltage numerically equal to the difference of level attempted to measure, for a determinated resistance of input (R in), in the display of the electronic digital voltmeter.

It is possible to replace the electronic digital voltmeter alternatively by a circuit made up by a scale-transformer (obtention of information), a source of stabilized voltage and an analogue-digital convertor of three digits with luminous electronic display (L.E.D.) as indicated in the annexed FIG. 3.

THEORY AND OPERATION

Basically it is possible to establish a linear relation between the difference of level h (pressure) an the output voltage (V out) of the circuit of amplification and transformation of scale.

In the simplest case of utilizing an operational amplifier with input-resistance (R in) and feed-back RF, naming $K_1$ the constant of the pressure transducer, it is possible to deduce the following relation as condition for the obtention of direct reading:

$$RF = Rin/K_1$$

This equation shows the relation which must exist, theoretically between the trimmers for allowing a direct reading.

Practically, in the case of using the circuit of FIG. 2, the operation would be the following:

1. Adjust 0 with the trimmer corresponding to the offset-zero (placed between the terminals 1 and 5 of the operational amplifier TL-081.

2. The portable tank is placed at a height or known level (of calibration) with regard to the bottom of the instrumental box containing the pressure and the trimmer corresponding to the feed-back-resistance is moved, placed between the terminals 2 and 6 of the operational amplifier TL 081, to obtain in the display of the digital volmeter a value of voltage numerically equal to the height selected for calibration.

3. Once realized the operations of calibration described, the device is ready for being for topographical use, In addition to making topographical measurements, the device in accordance with the invention can be used for conveniently measuring the height of a person. For this purpose a small water tank is mounted on a cursor vertically displaceable on a pole bar. The water tank is connected by a hose with the pressure transducer, the output of which is amplified and displayed digitally as described above. The cursory is put on the head of the person whose height is to be measured whereupon his height is immediately displayed by the electronic digital display.

I claim:

1. A device for instantaneous and exact measurement of height differences and topographical leveling in conditions of difficult visibility as in the night, fog, high thermal refraction of the atmosphere, galleries, tunnels and underground passages of mines, in fields with obstacles such as slopes, etc, said device comprising a single small portable water tank to be placed at a location the height of which is to be measured, said water tank being open to atmospheric pressure, a pressure transducer to be placed at a reference location, a single hose connecting said tank with said pressure transducer, valve means for expulsion of air from said hose, said pressure transducer comprising an elastic diaphragm subjected to hydrostatic pressure transmitted by said hose and a strain gauge bridge coupled with said diaphragm to generate a voltage signal proportional to pressure, and electronic circuit means for amplifying and displaying said voltage signal, said circuit means comprising an operational amplifier for amplifying said voltage signal and digital voltmeter for displaying the amplified signal, said digital voltmeter being calibrated to read in terms of height of location to be measured.

2. A device according to claim 1, in which said electronic circuit means comprises means for zero adjustment and for setting different height scales.

3. A method of instantaneous and exact measuring height differences in conditions of difficult visibility which comprises positioning at a location the height of which is to be measured a single small portable water tank, said tank being open to atmospheric pressure, providing at a reference location a pressure transducer, connecting said tank with said pressure transducer with a single hose to apply to said pressure transducer the hydrostatic pressure of water in said tank transmitted through said hose, whereby said pressure transducer outputs a signal voltage proportional to said hydrostatic pressure, amplifying said signal voltage and converting said amplified voltage to a digital display calibrated in terms of height.

4. A method according to claim 3, including the step of adjusting said display for zero reading and for difference scales.

* * * * *